(12) United States Patent
Kushima et al.

(10) Patent No.: US 11,522,195 B2
(45) Date of Patent: Dec. 6, 2022

(54) LIQUID METAL BUFFER LAYER FOR LITHIUM BATTERIES

(71) Applicant: University of Central Florida Research Foundation, Inc., Orlando, FL (US)

(72) Inventors: Akihiro Kushima, Orlando, FL (US); Supriya Koul, Orlando, FL (US); Kun Liang, Orlando, FL (US); Yang Yang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 252 days.

(21) Appl. No.: 16/746,398

(22) Filed: Jan. 17, 2020

(65) Prior Publication Data

US 2020/0235405 A1    Jul. 23, 2020

Related U.S. Application Data

(60) Provisional application No. 62/793,683, filed on Jan. 17, 2019.

(51) Int. Cl.
*H01M 4/62* (2006.01)
*H01M 4/38* (2006.01)
(Continued)

(52) U.S. Cl.
CPC ......... *H01M 4/628* (2013.01); *H01M 4/0402* (2013.01); *H01M 4/134* (2013.01);
(Continued)

(58) Field of Classification Search
None
See application file for complete search history.

(56) References Cited

U.S. PATENT DOCUMENTS

| | | |
|---|---|---|
| 4,950,560 A | 8/1990 | Tarcy |
| 8,841,014 B1 | 9/2014 | Deshpande et al. |

(Continued)

OTHER PUBLICATIONS

International Search Report and Written Opinion for PCT/US20/14130 (filing date: Jan. 17, 2020) dated Apr. 24, 2020; Applicant: University of Central Florida Research Foundation, Inc.
(Continued)

*Primary Examiner* — Wyatt P McConnell
(74) *Attorney, Agent, or Firm* — Owen G. Behrens; Paul Murty; Smith & Hopen, P.A.

(57) ABSTRACT

Enabling the use of lithium metal as an anode electrode is a key for developing next generation energy storage device beyond current lithium ion battery technology. However, there are major obstacles that need to be overcome before it can be used in commercial applications; specifically, dendrite formation can short the cell, and electrolyte decomposition contributes to decreased battery lifetimes. Each obstacle can be overcome by coating a lithium metal anode with a liquid metal buffer that enables uniform deposition of lithium ions thereon, preventing dendritic growth and forming a stable solid electrolyte interface to separate the lithium metal anode from the electrolyte within a battery cell. The liquid metal buffer becomes a semi-liquid buffer when contributing to forming a solid electrolyte interface, and can regain its liquid state when the lithium ions flow to the cathode of the battery cell.

14 Claims, 7 Drawing Sheets

(51) Int. Cl.
- *H01M 10/0525* (2010.01)
- *H01M 4/134* (2010.01)
- *H01M 4/1395* (2010.01)
- *H01M 4/04* (2006.01)
- *H01M 4/36* (2006.01)
- *H01M 4/02* (2006.01)

(52) U.S. Cl.
CPC ......... *H01M 4/1395* (2013.01); *H01M 4/366* (2013.01); *H01M 4/382* (2013.01); *H01M 10/0525* (2013.01); *H01M 2004/027* (2013.01)

(56) References Cited

U.S. PATENT DOCUMENTS

| | | |
|---|---|---|
| 2010/0143769 A1 | 6/2010 | Lee et al. |
| 2016/0240831 A1 | 8/2016 | Zeng et al. |
| 2018/0241089 A1* | 8/2018 | Anandan ............... H01M 4/628 |

OTHER PUBLICATIONS

Zheng et al., Interconnected hollow carbon nanospheres for stable lithium metal anodes. Nature Nanotechnology. 2014. vol. 9: 618-23.

Cha et al., 2D MoS2 as an efficient protective layer for lithium metal anodes in high-performance Li—S batteries. Nature Nanotechnology. 2018. vol. 13: 337-44.

Wan et al., Suppression of dendritic lithium growth by in situ formation of a chemically stable and mechanically strong solid electrolyte interphase. ACS Applied Materials & Interfaces. 2018. vol. 10: 593-601.

Ding et al., Dendrite-Free Lithium Deposition via Self-Healing Electrostatic Shield Mechanism. J. Am. Chem. Soc. 2013. vol. 135: 4450-4456.

Liang et al., A facile surface chemistry route to a stabilized lithium metal anode. Nature Energy. 2017. vol. 2 (No. 17119): 1-7.

Li et al., Suppression of dendritic lithium growth in lithium metal-based batteries. Chem. Commun., 2018. vol. 54: 6648-6661.

Lu et al., Dendrite-Free, High-Rate, Long-Life Lithium Metal Batteries with a 3D Cross-Linked Network Polymer Electrolyte. Adv. Mater. 2017. vol. 29: 1604460.

Shi et al., Strong texturing of lithium metal in batteries. PNAS. 2017. vol. 114 (No. 64): 12138-12143.

Liu et al., Suppressing Lithium Dendrite Growth with a Single-Component Coating. ACS Appl. Mater. Interfaces. 2017. vol. 9: 30635-30642.

Shi et al., Recent advances in inorganic 2D materials and their applications in lithium and sodium batteries. J. Mater. Chem. A. 2017. vol. 5: 3735-3758.

International Preliminary Report on Patentability for PCT/US20/14130 (filing date: Jan. 17, 2020) dated Jul. 29, 2021; Applicant: University of Central Florida Research Foundation, Inc.

* cited by examiner

LIQUID METAL BUFFER LAYER FOR LITHIUM BATTERIES

CROSS-REFERENCE TO RELATED APPLICATIONS

This nonprovisional application is a continuation of and claims priority to provisional No. 62/793,683, entitled "Liquid metal buffer layer for lithium batteries," filed on Jan. 17, 2019, by the same inventors, the entirety of which is incorporated herein by reference.

BACKGROUND OF THE INVENTION

1. Field of the Invention

This invention relates, generally, to liquid barriers to protect lithium batteries. More specifically, it relates to a liquid metal buffer layer and methods of disposing the buffer lay on a lithium battery to deter dendritic growth.

2. Brief Description of the Prior Art

During lithium battery charging and discharging, lithium ions and electrons flow between a cathode and an anode within a battery cell to create an energy flow within the battery. For example, while a lithium battery charges, lithium ions are released by the cathode and received by the anode, thereby generating a flow of electrons from the cathode to the anode. Conversely, during lithium battery discharge, lithium ions are released by the anode and received by the cathode, thereby generating a flow of electrons from the anode to the cathode. The direction of the flow of lithium ions and electrons dictates the flow of electrical current and the status of the battery.

In a typical lithium ion battery, the anode and the cathode are separated by a separator disposed in an electrolyte between the anode and cathode. The lithium ions travel within the electrolyte and through the separator when the ions travel between the anode and cathode, as discussed above. However, a common fault in lithium batteries is the formation of dendrites that can cause a short circuit in the cell by piercing the separator between the anode and the cathode. Dendrites are also associated with electrolyte decomposition and can result in drastic increases in thermal energy within a battery cell, at times leading to fires.

Naturally-occurring remedies to dendritic growth within a battery cell exist within the prior art. For example, a battery cell that has not yet cycled its charge lacks an interface between a solid electrolyte and an electrode. However, during a charging or discharging cycle, an interface forms between the electrolyte and the electrode. This interface is referred to as a solid electrolyte interface (SEI), and is a protective layer formed on the negative electrode of a lithium ion battery due to electrolyte decomposition. The process of forming the SEI, particularly when the anode is formed of a lithium metal, is a self-limiting process that prevents further electrolyte decomposition. However, unevenly-disposed SEI layers disrupt the distribution of electrical field on the lithium surface, thereby promoting the growth of porous lithium. As such, the increased surface area of lithium contributes to additional SEI formation and electrolyte decomposition. Moreover, a non-uniform lithium surface also becomes a source for lithium dendrite formations. As discussed above, dendrites can cause short circuiting of the battery, and can also lead to irreversible battery capacity loss. In addition, the exposure of fresh lithium surface associated with the dendrite formation causes the further decomposition of the electrolyte.

Attempts have been made to form surfaces that prevent or deter the formation of dendrites within a lithium ion battery. One such method involves the deposition of polystyrene nanospheres on a metal substrate, the nanospheres being subsequently coated in carbon and heated to form a layer of hollow carbon spheres disposed on the metal substrate. However, such a method deposits a nano-structured film on the metal surface, which increases the processing cost and forms a solid layer that is prone to cracking and/or breaking. Moreover, the film can cause a contact issue within the battery, and could delaminate to allow subsequent dendrite formation. [1]. An alternative method of forming a protective layer to prevent or deter dendritic formation includes the direct growth of a surface protection layer on a metal surface. Additives are disposed and spread about the metal surface, and lithium ions are added to the additives to form a coating on the metal. However, the process also involves an increased processing cost and manufacturing time due to the steps needed to form the coating. [2], [3]. Similar attempts are described in US20100143769 and US20160240831, which describe the formation of a solid electrolyte layer and a porous electrolyte layer to protect against the formation of dendrites. However, such attempts are directed to purely solid layers (which may be porous) to act are barriers to prevent dendrite formation; such solid layers are at risk of cracking or breaking, resulting in a renewed risk of dendrite formation and battery faults.

Accordingly, what is needed is an inexpensive semi-liquid buffer layer and a method of disposing the buffer on a lithium metal to form a stable and conformal interfacial layer in highly reducing environment. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an efficient coating for a lithium metal within a battery is now met by a new, useful, and nonobvious invention.

The novel structure includes a battery cell with a lithium metal anode spaced apart from a cathode. An electrolyte layer is disposed between the lithium metal anode and the cathode. A semi-liquid metal coating is disposed on a surface of the lithium metal anode, such that the semi-liquid metal coating forms a barrier between the electrolyte layer and the surface of the lithium metal anode. The semi-liquid metal coating prevents the electrolyte layer from contacting the surface of the lithium metal anode, thereby decreasing electrolytic decomposition within the battery cell. Moreover, the semi-liquid metal coating is evenly distributed on the surface of the lithium metal anode, such that the surface of the lithium metal anode is flat, thereby decreasing dendritic growth within the battery cell. In an embodiment, the semi-liquid metal coating is made of a gallium-indium-tin eutectic alloy. The semi-liquid metal coating solidifies in the presence of lithium ions, and liquifies in the absence of lithium ion. More particularly, the semi-liquid metal coating reacts with lithium ions to solidify during a charging state of the battery cell, and liquifies as lithium ions flow to the cathode during a discharge state of the battery cell.

The novel method of improving lithium ion battery cell performance and lifespan includes the steps of disposing a lithium metal anode within a lithium ion battery cell; coating the lithium metal anode with a semi-liquid metal coating which may made of a gallium-indium-tin eutectic alloy; and separating an electrolyte layer within the lithium ion battery cell from the lithium metal anode by the semi-liquid metal coating. By cycling an electrical current from a cathode within the lithium ion battery cell, through the electrolyte layer, to the lithium metal anode, lithium ions flow from the cathode to the lithium metal anode, and are captured on the semi-liquid metal coating. When the lithium ions are disposed on the semi-liquid metal coating, the semi-liquid metal coating transforms into a solid coating separating the lithium metal anode from the electrolyte layer. Conversely, the solid coating transforms to the semi-liquid metal coating when the lithium ions flow from the lithium metal anode to the cathode.

An object of the invention is to provide an inexpensive buffer layer that is easily and evenly disposed on a lithium metal layer to prevent dendrite growth within a battery cell. This and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a semi-liquid buffer layer that is evenly disposed on a lithium metal and maintains good contact with the lithium metal surface, thereby improving the durability of a battery within which the lithium metal is disposed. The semi-liquid buffer layer may be referred to as an artificial solid electrolyte interface (SEI) that stabilizes the lithium metal surface for a long cycle lifetime and good coulombic efficiency. Lithium metal is a promising anode material, due to the high specific capacity and negative electrochemical potential of lithium metal. However, lithium is thermodynamically-reactive; as such, lithium in contact with an electrolyte in a battery causes decomposition of the electrolyte and the formation of a naturally-occurring SEI on the surface of the lithium metal. By coating the lithium metal with the buffer layer, the naturally-occurring SEI from the electrolyte decomposition forms on the buffer layer, and not on the lithium metal itself. Accordingly, the buffer layer can improve battery performance and safety by preventing excessive electrolyte decomposition within a battery cell.

Figure 1:
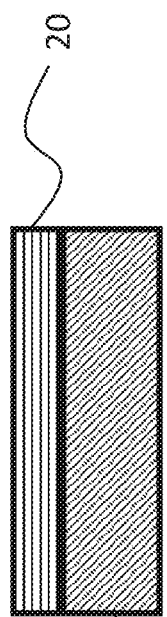
FIG. 1 depicts a liquid metal buffer disposed on a lithium metal, in accordance with an embodiment of the present invention.

As shown in FIG. 1, the artificial SEI 20 is disposed on a lithium metal surface 10. In an embodiment, the artificial SEI 20 is a room-temperature liquid metal, specifically a eutectic alloy consisting of gallium, indium and tin. By simply contacting the liquid metal with a lithium metal, the SEI 20 reacts with lithium to form a thin protection layer that is relatively evenly distributed across the surface of the lithium metal 10. In addition, the liquid nature of the surface-coated layer eliminates any sharp points on the lithium anode; such sharp points are often initiation sites for dendrites. By coating the lithium anode, the SEI 20 prevents direct contact between the lithium metal 10 and the electrolyte within the battery cell.

Since the gallium-indium-tin eutectic alloy is in a liquid state at room temperature, the alloy can maintain good contact with lithium metal surface. However, gallium (Ga) and tin (Sn) react with lithium (Li) to form LiGa and Li$_{4.4}$Sn, which are in solid states at room temperature. Such solids form in the presence of lithium, such as during charging of the battery that uses a lithium metal anode. However, when the battery discharges, the lithium ions therein are removed from the anode and flow toward the cathode; as such, the SEI can recover its liquid state once the lithium is removed. As such, the SEI buffer layer does not suffer from cracking or delamination due to a large change in the volume of the lithium anode during plating and stripping cycles. The buffer layer self-heals when lithium is removed from the layer.

Experimental Procedure and Results

In testing the artificial SEI buffer layer, Li—Li symmetric 2032-type coin cells were assembled using liquid-metal coated lithium electrodes to evaluate the effects of the coating on the performance of the batteries. The electrolyte used in the battery cell was 1 M $LiPF_6$ (lithium hexafluorophosphate solution) in EC/DMC (ethylene carbonate/dimethyl carbonate), in a 1:1 volume ratio. Constant current charge/discharge tests were performed at 5 $mA/cm^2$, and lithium metal electrodes without a liquid metal coating were tested for comparison with the SEI-coated lithium metal electrodes. Charge and discharge times were set to be one hour.

Figure 2:
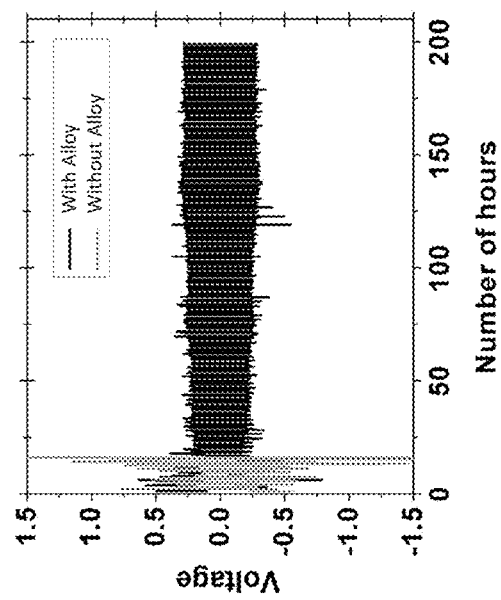
FIG. 2 is a graphical depiction comparing charge and discharge cycles after 100 cycles at 5 mA/cm$^2$ for lithium with the liquid metal buffer of FIG. 4 (depicted in black), and without the liquid metal buffer of FIG. 4 (depicted in red).

FIG. 2 depicts a graph showing the voltage versus time during charging and discharging for the lithium metal coated with SEI, and the lithium metal without the SEI coating. As shown in FIG. 2, the battery cells without liquid metal failed only after few cycles. The huge increase in the voltage of the non-coated lithium corresponds to significant growth of naturally-occurring SEI on the lithium electrode, as opposed to the lithium metal surface. On the other hand, the cells with liquid metal coating were able to cycle for 100 cycles. The constant and stable voltage profile during the charge/discharge cycles indicates the stable SEI layer was formed on the lithium metal surface.

Figure 4:
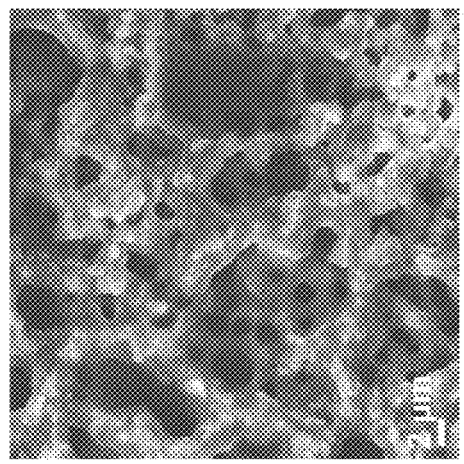
FIG. 4 is a SEM image of a top surface of a lithium anode without a liquid metal buffer after failure at 5 mA/cm$^2$.
Figure 3:
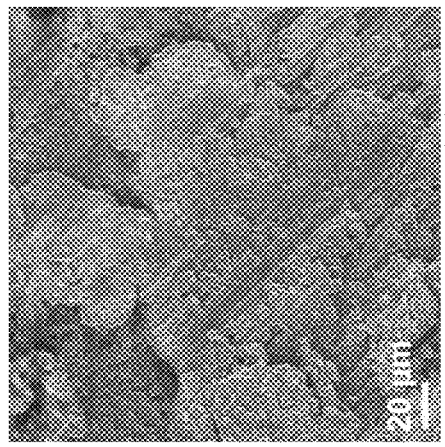
FIG. 3 is a scanning electron microscope (SEM) image of a top surface of a lithium metal including a liquid metal buffer after 100 cycles at 5 mA/cm$^2$.

FIGS. 3-4 depicts scanning electron microscopy (SEM) images taken to analyze the surfaces of the electrodes discussed above. FIG. 3 depicts the surface of a lithium electrode with a liquid metal buffer; FIG. 4 depicts the surface of a lithium electrode that lacks a liquid metal buffer. As shown in the figures, the liquid metal buffer shown in FIG. 3 causes the surface of the lithium electrode to be relatively flat and uniform, even after 100 charge/discharge cycles, as discussed in detail above. However, the lack of a liquid metal buffer, as shown in FIG. 4, causes the surface of the lithium electrode to be porous and includes dendrite formation on the surface.

Figure 5A:
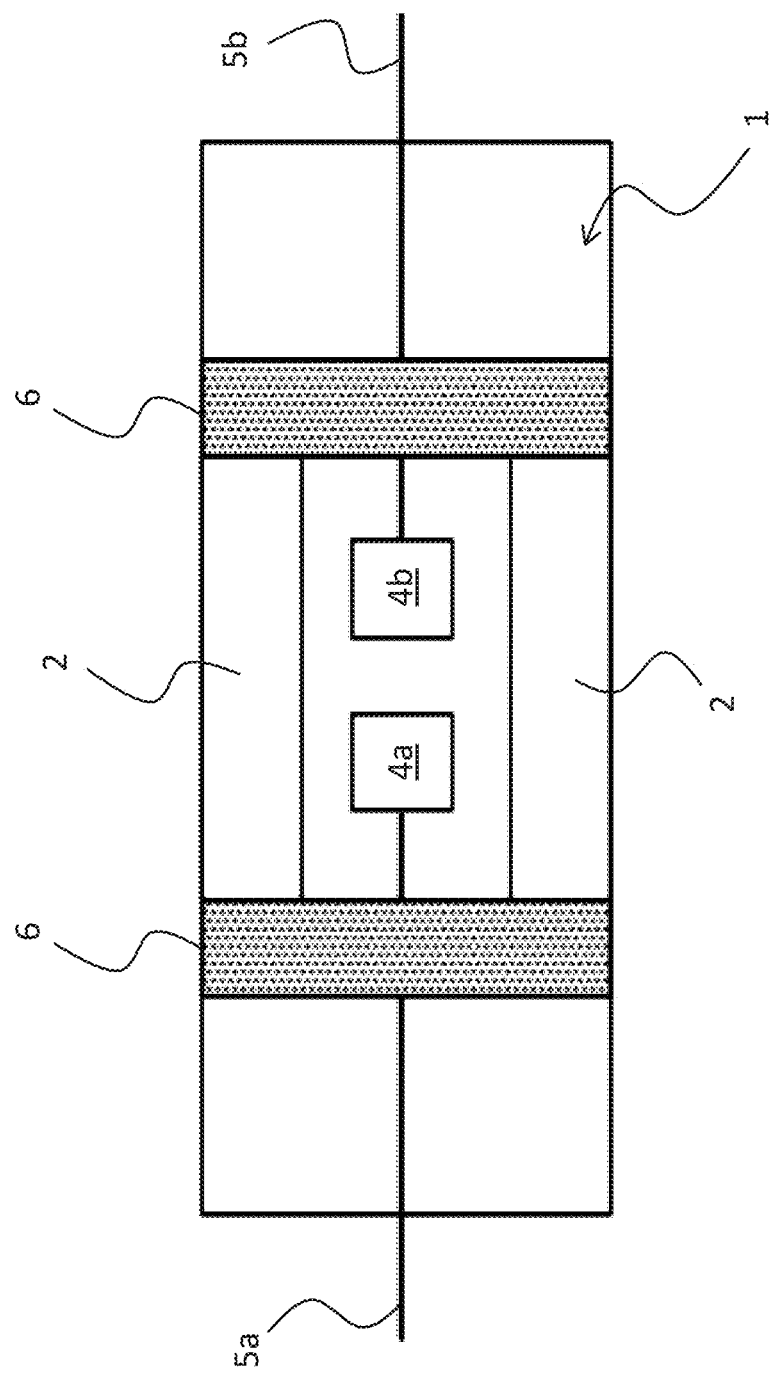
FIG. 5A is top-down orthogonal view of a battery cell housing including a transparent window, such that the battery can be observed during charge cycles and discharge cycles.
Figure 5B:
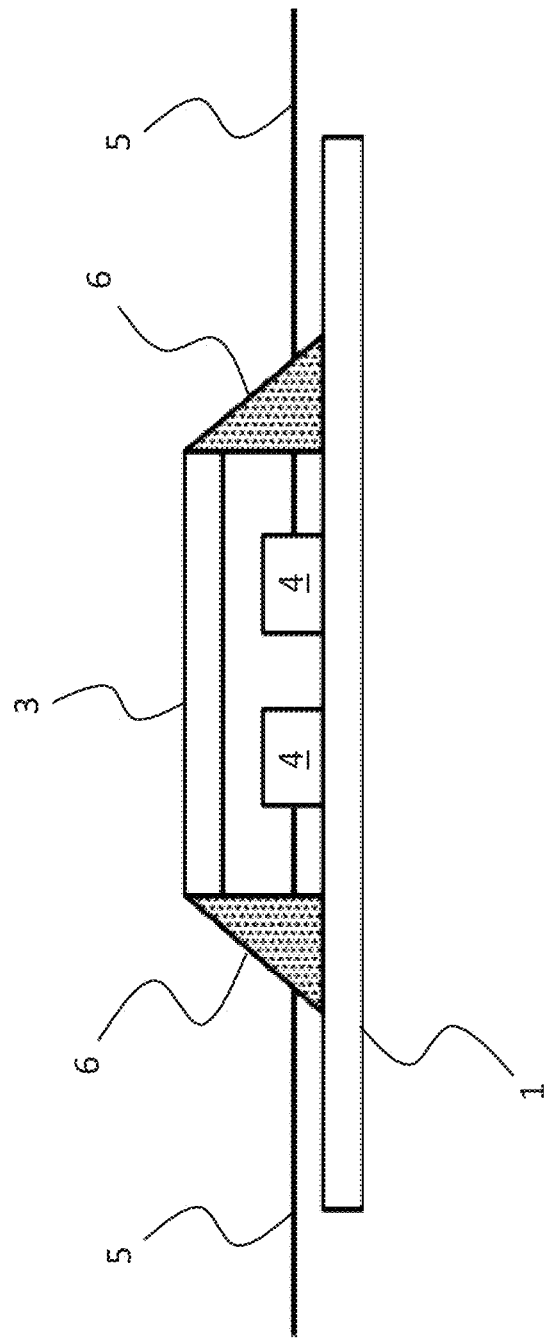
FIG. 5B is a side orthogonal view of the battery cell housing of FIG. 5A.

A further test was performed to confirm the effectiveness of a liquid metal buffer disposed on a lithium metal. As shown in FIGS. 5A and 5B, in-situ optical microscopy tests were performed using a transparent glass cell including a base glass slide 1 and a cover glass 3, such that the electrodes could be easily observed during charge/discharge cycling. Also as shown in FIGS. 5A-5B, the experimental set up includes separate lithium metal components 4a and 4b, with lithium metal 4a electrically connected to induction wire 5a (such as copper wire), and lithium metal 4b electrically connected to induction wire 5b. The transparent glass cell is secured together with epoxy glue 6, with lithium metals 4a, 4b secured between base glass slide 1 and cover glass 3. In addition, spacers 2 are disposed between base glass slide 1 and cover glass 3 to provide space for lithium metals 4a, 4b to be tested during the experiment. The space disposed between base glass side 1, cover glass 3, and spacers 2 is filled with an electrolyte to facilitate the experiment.

Figure 6:
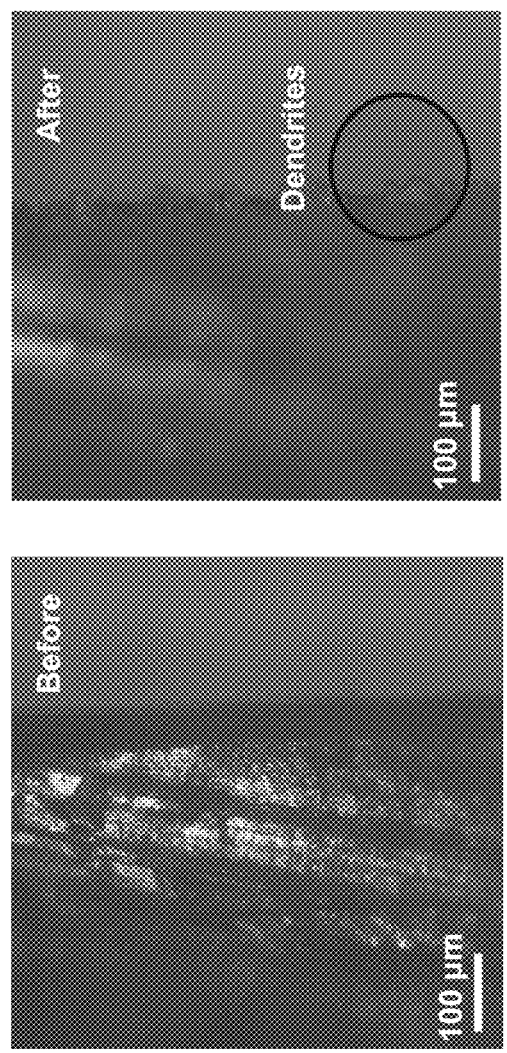
FIG. 6 is a set of optical micrograph views of a lithium metal before applying a 0.5 mA current, and after applying a 0.5 mA current, showing dendrite formation after applying the 0.5 mA current.
Figure 7:
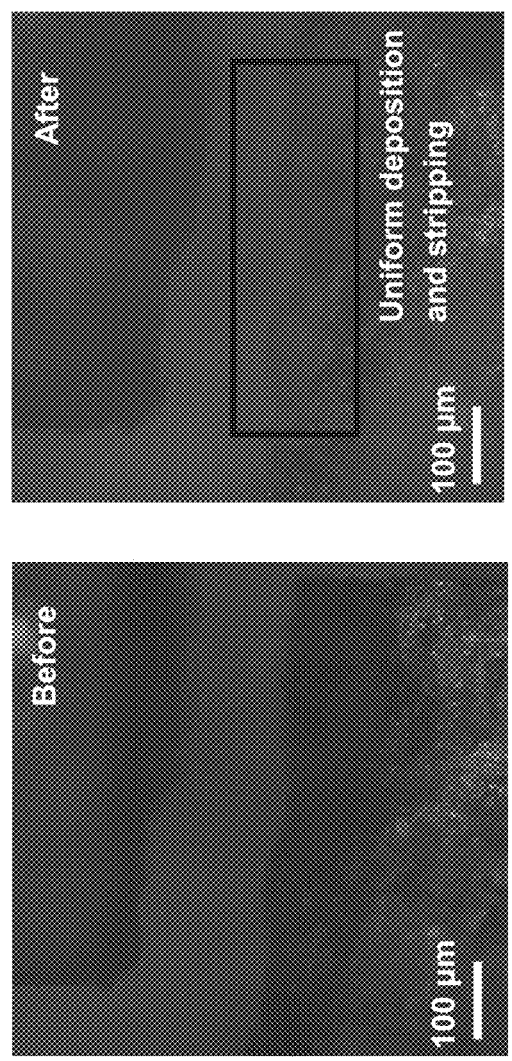
FIG. 7 is a set of optical micrograph views of a lithium metal with a liquid metal buffer before applying a 0.5 mA current, and after applying a 0.5 mA current, showing uniform deposition of lithium ions.

During the tests, 0.5 mA of current was applied to a lithium metal flake, measuring 3 mm×3 mm×0.46 mm. FIG. 6 depicts the microscopic results of the application of current to the lithium metal flake of FIGS. 5A-5B, with the lithium metal flake lacking a liquid metal buffer layer. As shown in FIG. 6, before the current was applied to the lithium metal flake, the surface of the lithium was relatively smooth; however, after applying current to the lithium without the liquid metal buffer, dendrites formed on the lithium surface. However, as shown in FIG. 7, when the lithium metal flake was coated with the liquid metal buffer, the lithium surface remained relatively smooth and flat even after current was applied to the lithium. As such, the liquid metal buffer led to a uniform deposition of lithium ions on the surface of the lithium metal.

CONCLUSION

The electrochemical tests, SEM, and the in-situ optical microscopy tests indicate that the liquid metal buffer stabilizes the lithium metal surface, and prevents unstable SEI and dendrite formations, thereby improving the cyclability of a lithium metal anode. The liquid metal buffer thereby enables the use of lithium metal as anode, which is essential for enhancing lithium ion batteries and developing next-generation energy storage technologies, such as lithium-air and lithium-sulfur batteries.

REFERENCES

[1] G. Zheng et al., *Interconnected hollow carbon nanospheres for stable lithium metal anodes*. Nature Nanotechnology 9 (2014) 618-23.
[2] E. Cha et al., *2D $MoS_2$ as an efficient protective layer for lithium metal anodes in high-performance Li—S batteries*. Nature Nanotechnology 13 (2018) 337-44.
[3] G. Wan et al., *Suppression of dendritic lithium growth by in situ formation of a chemically stable and mechanically strong solid electrolyte interphase*. ACS Applied Materials & Interfaces 10 (2018) 593-601.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A battery cell, prior initial discharging, comprising:
   a lithium metal anode spaced apart from a cathode, with an electrolyte layer disposed between the lithium metal anode and the cathode;

a unitary semi-liquid metal coating disposed on a surface of the lithium metal anode, the unitary semi-liquid metal coating in direct contact with the electrolyte layer, such that the unitary semi-liquid metal coating forms a barrier between the electrolyte layer and the surface of the lithium metal anode, wherein the unitary semi-liquid metal coating prevents the electrolyte layer from contacting the surface of the lithium metal anode, thereby decreasing electrolytic decomposition within the battery cell.

2. The battery cell of claim I, wherein the unitary semi-liquid metal coating is evenly distributed on the surface of the lithium metal anode, such that the surface of the lithium metal anode is flat, thereby decreasing dendritic growth within the battery cell.

3. The battery cell of claim 1, wherein the unitary semi-liquid. metal coating is made of a gallium-indium-tin eutectic alloy.

4. The battery cell of claim 1, wherein the unitary semi-liquid metal coating solidifies in the presence of lithium ions, and liquifies in the absence of lithium ions.

5. The battery cell of claim 4, wherein the unitary semi-liquid metal coating reacts with lithium ions to solidify during a charging state of the battery cell.

6. The battery cell of claim 4. wherein the unitary semi-liquid metal coating liquifies as lithium ions flow to the cathode during a discharge state of the battery cell.

7. A method of improving lithium ion battery cell performance and lifespan, the method comprising, prior to any discharging of the battery, the steps of:

disposing a lithium metal ode within a lithium ion battery cell;

coating the lithium metal anode with a unitary semi-liquid metal coating, the unitary semi-liquid metal coating directly disposed on the lithium metal anode;

separating an electrolyte layer within the lithium ion battery cell from the lithium metal anode by the unitary semi-liquid metal coating, such that the unitary semi-liquid metal coating is in direct contact with the electrolyte layer, thereby decreasing electrolytic decomposition within the battery cell;

cycling an electrical current from a cathode within the lithium ion battery cell, through the electrolyte layer, to the lithium metal anode, such that lithium ions flow from the cathode toward the lithium metal anode;

disposing the lithium ions on the unitary semi-liquid metal coating, thereby transforming the unitary semi-liquid metal coating into a solid coating separating the lithium metal anode from the electrolyte layer, wherein the solid coating transforms to the unitary semi-liquid metal coating when the lithium ions flow from the lithium metal anode to the cathode.

8. The method of claim 7, wherein the unitary semi-liquid metal coating is made of a gallium-indium-tin eutectic alloy.

9. The method of claim 7, wherein during the step of coating the lithium metal anode with the unitary semi-liquid metal coating, the unitary semi-liquid metal coating is evenly distributed on the surface of the lithium metal anode, such that the surface of the lithium metal anode is flat, thereby decreasing dendritic growth within the battery cell.

10. A method of reducing dendrite formation in a battery cell, the method comprising the steps of:

coating a lithium metal anode in a battery cell with a unitary semi-liquid metal coating made of a gallium-indium-tin eutectic alloy, such that the unitary semi-liquid metal coating is directly disposed on the lithium metal anode;

separating the lithium metal anode from an electrolyte layer and a cathode within the battery cell via the unitary semi-liquid metal coating, such that the unitary semi-liquid metal coating is in direct contact with the electrolyte layer, wherein the unitary semi-liquid metal coating prevents the electrolyte layer from contacting the surface of the lithium metal anode, thereby decreasing electrolytic decomposition within the battery cell.

11. The method of claim 10, wherein during the step of coating the lithium metal anode with the unitary semi-liquid metal coating, the unitary semi-liquid metal coating is evenly distributed on the surface of the lithium metal anode, such that the surface of the lithium metal anode is flat, thereby decreasing dendritic growth within the battery cell.

12. The method of claim 10, further comprising a step of flowing lithium ions from the cathode toward the lithium metal anode during a charging state of the battery cell.

13. The method of claim 12, further comprising a step of capturing the lithium ions at the unitary semi-liquid metal coating, thereby solidifying the semi-liquid metal coating.

14. The method of claim 12, further comprising a step of liquifying the unitary semi-liquid metal coating during a discharge state of the battery cell, during which the lithium ions flow toward the cathode.

* * * * *